United States Patent
Smith et al.

(10) Patent No.: US 9,164,768 B2
(45) Date of Patent: Oct. 20, 2015

(54) EXECUTING AN INSTRUCTION SET USING A PREFIX TO INTERPRET AN OPERATOR FIELD AS EITHER A FIRST OR A SECOND OPERATOR FIELD

(75) Inventors: Peter Smith, Cambridgeshire (GB); David Richard Hargreaves, Cambridge (GB)

(73) Assignee: Cambridge Silicon Radio Limited, Cambridge (GB)

(*) Notice: Subject to any disclaimer, the term of this patent is extended or adjusted under 35 U.S.C. 154(b) by 798 days.

(21) Appl. No.: 13/333,939

(22) Filed: Dec. 21, 2011

(65) Prior Publication Data

US 2012/0331274 A1 Dec. 27, 2012

(30) Foreign Application Priority Data

Dec. 24, 2010 (GB) .................................. 1021990.5

(51) Int. Cl.
G06F 15/00 (2006.01)
G06F 9/30 (2006.01)
G06F 9/40 (2006.01)

(52) U.S. Cl.
CPC .......... *G06F 9/30185* (2013.01); *G06F 9/3016* (2013.01)

(58) Field of Classification Search
USPC ......................................................... 712/209
See application file for complete search history.

(56) References Cited

U.S. PATENT DOCUMENTS

| | | | | |
|---|---|---|---|---|
| 3,657,705 A * | 4/1972 | Mekota et al. | ................ | 712/208 |
| 5,303,358 A * | 4/1994 | Baum | ........................... | 712/226 |
| 5,845,102 A * | 12/1998 | Miller et al. | .................. | 712/211 |
| 6,185,670 B1 * | 2/2001 | Huff et al. | ..................... | 712/208 |
| 6,651,160 B1 | 11/2003 | Hays | | |
| 6,970,998 B1 | 11/2005 | Favor | | |
| 2003/0236965 A1* | 12/2003 | Sheaffer | ........................ | 712/209 |
| 2004/0078552 A1* | 4/2004 | Chauvel et al. | ............... | 712/209 |
| 2004/0186981 A1* | 9/2004 | Christie et al. | ................ | 712/210 |
| 2005/0188179 A1* | 8/2005 | Henry et al. | ................... | 712/210 |
| 2009/0089564 A1* | 4/2009 | Brickell et al. | ............... | 712/239 |
| 2009/0210658 A1* | 8/2009 | Arakawa | ......................... | 712/41 |
| 2009/0240926 A1* | 9/2009 | Itou | .............................. | 712/221 |
| 2013/0246765 A1* | 9/2013 | Arakawa | ...................... | 712/226 |

FOREIGN PATENT DOCUMENTS

JP 2000-284962 A 10/2000

OTHER PUBLICATIONS

UK Search Report dated Apr. 5, 2012, in corresponding EP application.

* cited by examiner

*Primary Examiner* — Geroge Giroux

(57) ABSTRACT

A method of executing an instruction set having a first instruction and a second instruction, includes: reading the first instruction; determining whether the first instruction is integral with the second instruction; reading the second instruction; when the first instruction is integral with the second instruction, interpreting a first operator field of the second instruction to represent a first operator; and when the first instruction is not integral with the second instruction, interpreting the first operator field of the second instruction to represent a second operator, wherein the first operator is different to the second operator.

8 Claims, 2 Drawing Sheets

EXECUTING AN INSTRUCTION SET USING A PREFIX TO INTERPRET AN OPERATOR FIELD AS EITHER A FIRST OR A SECOND OPERATOR FIELD

BACKGROUND OF THE INVENTION

This invention relates generally to instruction set computing. In particular the invention relates to a method of executing an instruction set, and an execution processor for executing the instruction set.

Reduced instruction set computing (RISC) processors typically have a fixed bit-width instruction size. Common sizes are 16-bits and 32-bits. 32-bits give flexibility in expressing instructions and operands but at the expense of typically larger code size than the 16-bit instruction sets.

A problem with the short (16-bit) instruction sets is that they have a restricted number of bits for expressing operators. Some processors (for example those operating the reduced instruction set computer architecture MIPS) make use of prefixes. A prefix is an instruction which is associated with another instruction. A prefix contains the same number of bits as the instruction with which it is associated. For example, the MIPS architecture uses short instructions each having 16 bits. Both an MIPS prefix and the MIPS instruction with which it is associated have 16 bits.

Prefixes have been used to signify that a field in an instruction is to be interpreted as having the same meaning but in a different location in the instruction. In a simplified example, FIG. 1a illustrates an instruction in which field A is in location 1, field B is in location 2, field C is in location 3, and field D is in location 4 of an instruction. FIG. 1b illustrates a prefix which precedes the instruction of FIG. 1a and indicates that the fields in locations 1 and 3 of the instruction are to be interchanged. FIG. 1c illustrates the interpretation that the executing processor is left with of the instruction of FIG. 1a as a result of the prefix of FIG. 1b. The operands in locations 1 and 3 have been interchanged. Now field C is in location 1, field B in location 2, field A in location 3, and field D in location 4. This example is a simplified illustration. In a real situation the prefix would be used to carry out other functions as well as indicating that the operands in locations 1 and 3 of the instruction are to be interchanged.

The example of FIGS. 1a, 1b and 1c illustrates a change in the relative location of operators within the instruction. However, short 16-bit instructions are limited compared to long 32-bit instructions in that the number of operators available for use in the short instructions is significantly reduced compared to the number of operators available for use in the long instructions due to the length of the instructions. The method illustrated in FIGS. 1a, 1b and 1c does not increase the number of operators available for use in a short instruction.

There is therefore a need for a method of executing a reduced instruction set which increases the number of operators available for use in the instruction.

SUMMARY OF THE INVENTION

According to a first aspect, there is provided a method of executing an instruction set comprising a first instruction and a second instruction, the method comprising: reading the first instruction; determining whether the first instruction is integral with the second instruction; reading the second instruction; if the first instruction is integral with the second instruction, interpreting a first operator field of the second instruction to represent a first operator; and if the first instruction is not integral with the second instruction, interpreting the first operator field of the second instruction to represent a second operator, wherein the first operator is different to the second operator.

Suitably, the method comprises determining that the first instruction is integral with the second instruction by identifying an indicator in the first instruction.

Suitably, the indicator in the first instruction is a predetermined sequence of bits.

Optionally, the first operator is an Add/Sub operator, and the second operator is a Mov/Add operator.

Suitably the method further comprises if the first instruction is integral with the second instruction, interpreting the first operator field of the second instruction to require an additional operand. Suitably, the additional operand is not specified in the second instruction.

According to a second aspect, there is provided an execution processor arranged to execute an instruction set comprising a first instruction and a second instruction, the execution processor comprising: an instruction reader arranged to read the first instruction and the second instruction; a determination unit arranged to determine whether the first instruction is integral with the second instruction; and an interpretation unit arranged to: if the first instruction is integral with the second instruction, interpret a first operator field of the second instruction to represent a first operator; and if the first instruction is not integral with the second instruction, interpret the first operator field of the second instruction to represent a second operator, wherein the first operator is different to the second operator.

Suitably, the determination unit is arranged to determine that the first instruction is integral with the second instruction by identifying an indicator in the first instruction.

Suitably, the indicator in the first instruction is a predetermined sequence of bits.

Optionally, the first operator is an Add/Sub operator, and the second operator is a Mov/Add operator.

Suitably, the interpretation unit is further arranged to, if the first instruction is integral with the second instruction, interpret the first operator field of the second instruction to require an additional operand. Suitably, the additional operand is not specified in the second instruction.

BRIEF DESCRIPTION OF THE DRAWINGS

The following disclosure will now be described by way of example with reference to the accompanying drawings. In the drawings.

DETAILED DESCRIPTION OF THE INVENTION

Known reduced instruction sets use short instructions, generally having 16 bits. These instructions can be grouped into three classes:
1) short instructions which are prefixes;
2) short instructions which are not prefixes but which are associated with one or more short instructions which are prefixes; and
3) short instructions which are isolated full instructions.

From hereon instructions which are not prefixes but which are associated with one or more instructions which are prefixes (group 2 above) will be called main instructions.

Known reduced instruction sets which use prefixes do so to extend an operand or operator of the main instruction with which the prefix is associated. The following discussion describes a reduced instruction set which enables a prefix to increase the number of operators which can be expressed by an instruction. By increasing the set of available operators which can be expressed by an instruction, complex instructions can be expressed in fewer individual instructions. The efficiency of the overall instruction set is thereby increased.

Reduced instruction sets typically have 16-bit long instructions, however it is to be understood that the disclosure extends to instructions having any number of bits.

Figures 1A, 1B, 1C:
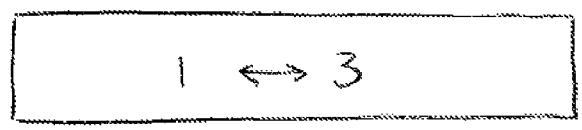
FIG. 1a illustrates an instruction.
FIG. 1b illustrates a prefix.
FIG. 1c illustrates the interpretation of the instruction of FIG. 1a when preceded by the prefix of FIG. 1b.
Figure 2:
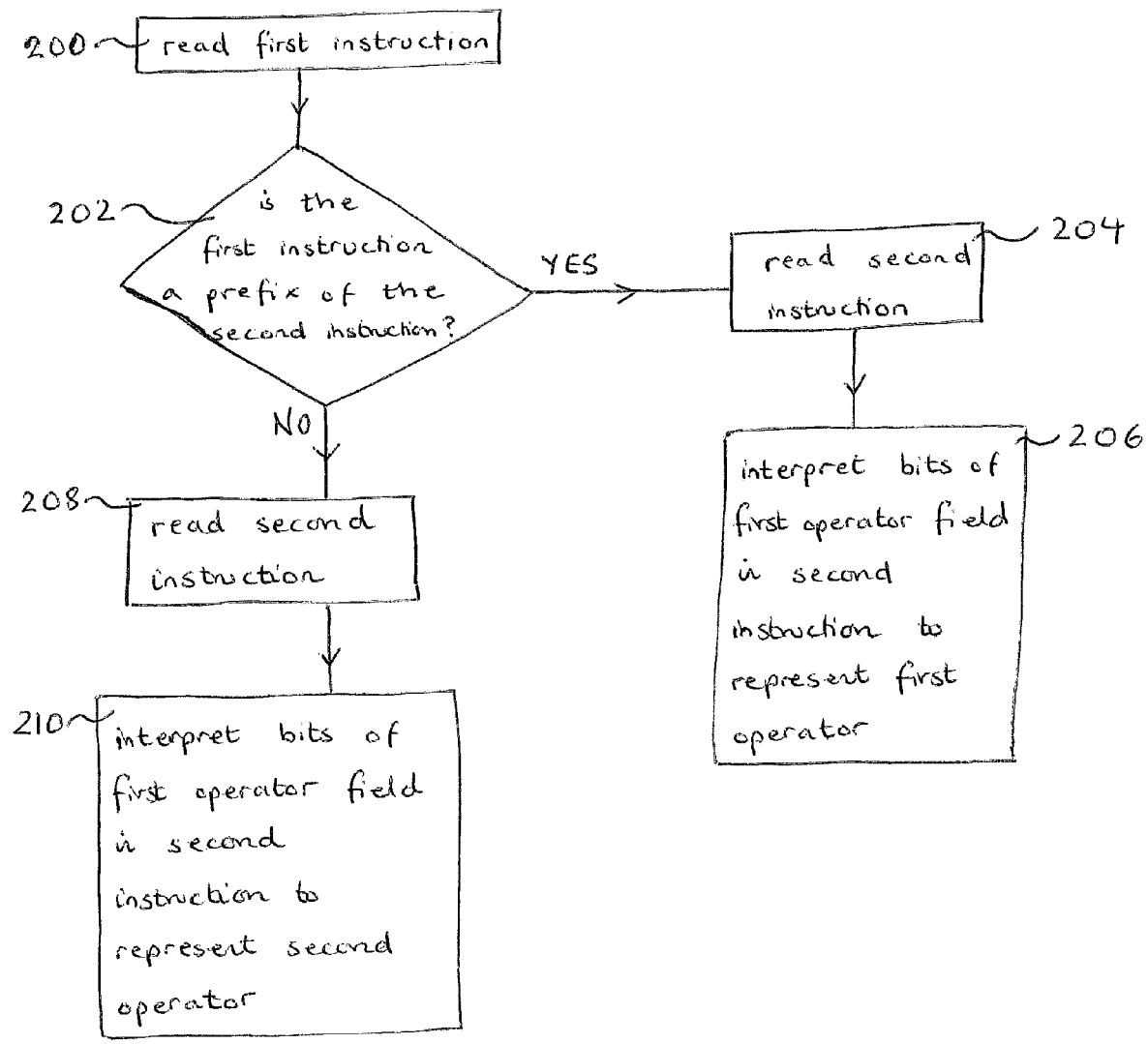
FIG. 2 is a flow diagram illustrating the method by which a processor executes an instruction set according to the protocol described herein.

The flow diagram of FIG. 2 illustrates a sequence of steps. It is to be understood that not all the steps in this figure are necessarily required, and that some of the steps may be performed in a different order to that depicted. For example, the first instruction may be read by the execution processor prior to the execution processor reading the second instruction. Alternatively, the second instruction may be read by the execution processor prior to the execution processor reading the first instruction.

FIG. 2 illustrates the method by which a processor executes some instructions in the instruction set. In this example, the instruction set comprises a first instruction and a second instruction. The second instruction is a main instruction. The first instruction is either (i) a prefix associated with the second instruction, or (ii) another instruction unrelated to the second instruction. If the first instruction is a prefix to the second instruction then the second instruction is interpreted as having one meaning. If the first instruction is not a prefix to the second instruction then the second instruction is interpreted as having a different meaning. In this latter situation, the first instruction is unrelated to the second instruction, and is processed by the execution processor accordingly.

Referring to FIG. 2, at step 200 the processor reads the first instruction. At step 202, the processor determines whether the first instruction is a prefix of a second instruction. If the answer to this determination is YES, that the first instruction is a prefix of a second instruction, then the method follows through to step 204 where the second instruction is read. Then, at step 206, the processor interprets a first operator field in the second instruction to represent a first operator. If the answer to the determination of step 202 is NO, that the first instruction is not a prefix of a second instruction, then the method follows through to step 208 where the second instruction is read. Then, at step 210, the processor interprets the first operator field of the second instruction to represent a second operator. The first operator is different to the second operator. The first instruction is not a prefix of the second instruction. The first instruction is therefore processed by the execution processor as usual, i.e. in accordance with known methods.

Suitably, the processor interprets the remainder of the second instruction independently of the prefix. In other words, the processor interprets the remainder of the second instruction as it would have done had the second instruction not been accompanied by a prefix.

As discussed above, a prefix is an instruction which is associated with another instruction. Generally, a prefix is integral with another instruction. A prefix may be an instruction which forms a part of another instruction. A prefix may take one of many forms. For example, a prefix may include bits which are to be incorporated into the bits of another instruction. A prefix may include bits which are interpreted by an executing processor as altering the meaning of another instruction.

Suitably, the processor determines if the first instruction is a prefix of the second instruction by searching for an identifier in the first instruction. For example, the prefix may include a sequence of bits which are identifiable by the processor as indicating that the instruction is a prefix. In an example instruction set comprising 16-bit long instructions, the identifier of a prefix constitutes the first 4 bits of the prefix. These first 4 bits are 1111. In a different example instruction set the identifier of a prefix could constitute a different number and/or different location of bits in the prefix.

EXAMPLE

Consider a first operator field comprising a bit or a bit sequence in an instruction. In isolation the bit or bit sequence is interpreted by an example execution processor to represent a "Mov/Add" operator. The "Mov/Add" operator selects between the two instructions:

$$\text{Reg}C = \text{Reg}A \quad \text{(equation 1)}$$

$$\text{Reg}C = \text{Reg}C + \text{Reg}A \quad \text{(equation 2)}$$

Equation 1 is a Mov operation in which the contents of register A are shifted to register C. Equation 2 is an Add operation in which the contents of register A are added to those of register C and the result stored in register C.

The presence of a prefix associated with the instruction changes the interpretation held by the execution processor of the first operator field. Instead of interpreting the bit or bit sequence as a "Mov/Add" operator, the execution processor interprets the bit or bit sequence as an "Add/Sub" operator. The "Add/Sub" operator selects between the two instructions:

$$\text{Reg}C = \text{Reg}A + \text{Reg}B \quad \text{(equation 3)}$$

$$\text{Reg}C = \text{Reg}A - \text{Reg}B \quad \text{(equation 4)}$$

Equation 3 is an Add operation in which the contents of register A are added to those of register B and the result stored in register C. Equation 4 is a Sub operation in which the contents of register B are subtracted from the contents of register A and stored in register C.

In terms of the method described with respect to FIG. 2, in this example a first instruction is read at step 200. If it is determined at step 202 that this first instruction is not a prefix of a second instruction, then the second instruction is read at step 208. The bit or bit sequence of the first operator field of the second instruction is interpreted by the execution processor in its isolated form, i.e. as a "Mov/Add" operator. Alternatively, if it is determined at step 202 that the first instruction is a prefix of the second instruction, then when the second instruction is read, the bit or bit sequence of the first operator field is interpreted by the execution processor to be an "Add/Sub" operator.

The presence of the prefix (first instruction) changes the execution processor's interpretation of a bit or bit sequence in the main instruction (second instruction) representing an operator.

The presence of a prefix associated with a main instruction may also introduce a further operand into the main instruction. Alternatively, the presence of the prefix associated with a main instruction may introduce a plurality of further operands into the main instruction. For example, in the described example above the presence of the prefix changes the meaning of an operator field from meaning a "Mov/Add" operator to an "Add/Sub" operator. The "Mov/Add" operator requires two registers: register A and register C. The "Add/Sub" operator requires three registers: register A, register B, and register C. The presence of the prefix has therefore introduced a further operand, the register B, into the main instruction. This further operand may be specified in the main instruction. Alternatively, this further operand may not be specified in the main instruction.

Suitably, the presence of the prefix associated with the main instruction is interpreted by the execution processor as indicating that each of a plurality of operator fields in the main instruction is to be interpreted as representing a different operator to the operator that that operator field would be interpreted as representing in isolation. In this case, suitably the processor interprets the remainder of the main instruction as it would have done had the main instruction not been accompanied by a prefix.

Optionally, the method of FIG. 2 may be extended such that the interpretation of the bits of a first operator field in the second instruction is dependent not only on whether the first instruction is a prefix of the second instruction but also on the specific bit sequence of all or part of the prefix. For example, a first bit or sequence of bits in the prefix may be interpreted by the execution processor to mean that the first operator field represents one operator, whereas a second bit or sequence of bits in the prefix may be interpreted by the execution processor to mean that the first operator field represents another operator.

The specific bit sequence of the prefix may be interpreted by the execution processor as specifying which operator field of the second instruction is to be interpreted as representing a different operator to the operator it represents in isolation. For example, a first bit sequence of the prefix may be interpreted as indicating that a first operator field represents operator X (rather than the operator Y it represents in isolation); and a second bit sequence of the prefix may be interpreted as indicating that a second operator field represents operator S (rather than the operator T it represents in isolation). Operators X and S may be the same. Operators X and S may be different. Operators Y and T may be the same. Operators Y and T may be different.

Optionally, the method of FIG. 2 may be extended such that the location of a specific bit sequence in the prefix is interpreted by the execution processor as specifying which operator field of the second instruction is to be interpreted as representing a different operator to the operator it represents in isolation. For example, a specific bit sequence located in one position in the prefix may be interpreted as indicating that a first operator field represents operator X (rather than the operator Y it represents in isolation); and the specific bit sequence located in a second position in the prefix may be interpreted as indicating that a second operator field represents operator S (rather than the operator T it represents in isolation). Operators X and S may be the same. Operators X and S may be different. Operators Y and T may be the same. Operators Y and T may be different.

This disclosure also relates to an execution processor which is arranged to execute an instruction set which is formed according to the protocol described herein. The execution processor is arranged to perform the method of FIG. 2. The execution processor comprises an instruction reader arranged to read instructions, a determination unit arranged to determine whether one instruction is a prefix of a main instruction, and an interpretation unit arranged to interpret the operator fields of the main instruction according to a protocol in which at least one operator field represents a different operator depending on the presence of an associated prefix.

Preferably, the execution processor is implemented in hardware. Optionally, the execution processor is implemented in software.

The methods and apparatus described herein operate according to a protocol in which the bit or bits of an operator field of an instruction is/are to be interpreted by the executing processor as having one significance when that instruction is not accompanied by a prefix and another significance when that instruction is accompanied by a prefix. In particular, an operator field is interpreted as representing one operator when there is no accompanying prefix, and as representing another operator when there is a prefix. For a given operator location in a main instruction, the prefix changes the interpretation of the bits at that location from a first interpretation (which is the interpretation those bits have in isolation) to a second interpretation.

These methods and apparatus are more efficient than the prior art discussed because they increase the number of available operators for use in each instruction. By increasing the set of available operators which can be expressed by an instruction, complex instructions can be expressed in fewer individual instructions. The efficiency of the overall instruction set is thereby increased.

The applicant draws attention to the fact that the present invention may include any feature or combination of features disclosed herein either implicitly or explicitly or any generalisation thereof, without limitation to the scope of any of the present claims. In view of the foregoing description it will be evident to a person skilled in the art that various modifications may be made within the scope of the invention.

The invention claimed is:

1. A method of executing an instruction set comprising a first instruction and a second instruction, the method comprising:
   reading the first instruction;
   determining whether the first instruction is integral with the second instruction;
   reading the second instruction;
   when the first instruction is integral with the second instruction, interpreting a first operator field of the second instruction to represent a first operator, wherein the first operator is an Add/Sub operator, and interpreting the first operator field of the second instruction to require an additional operand; and
   when the first instruction is not integral with the second instruction, interpreting the first operator field of the second instruction to represent a second operator, wherein the second operator is a Mov/Add operator.

2. A method as claimed in claim 1, comprising determining that the first instruction is integral with the second instruction by identifying an indicator in the first instruction.

3. A method as claimed in claim 2, wherein the indicator in the first instruction is a predetermined sequence of bits.

4. A method as claimed in claim 1, wherein the additional operand is not specified in the second instruction.

5. An execution processor arranged to execute an instruction set comprising a first instruction and a second instruction, the execution processor comprising:
   an instruction reader arranged to read the first instruction and the second instruction;
   a determination unit arranged to determine whether the first instruction is integral with the second instruction; and an interpretation unit arranged to:
- when the first instruction is integral with the second instruction, interpret a first operator field of the second instruction to represent a first operator, wherein the first operator is an Add/Sub operator, and interpreting the first operator field of the second instruction to require an additional operand; and
- when the first instruction is not integral with the second instruction, interpret the first operator field of the second instruction to represent a second operator, wherein the second operator is a Mov/Add operator.

6. An execution processor as claimed in claim 5, wherein the determination unit is arranged to determine that the first instruction is integral with the second instruction by identifying an indicator in the first instruction.

7. An execution processor as claimed in claim 6, wherein the indicator in the first instruction is a predetermined sequence of bits.

8. An execution processor as claimed in claim 5, wherein the additional operand is not specified in the second instruction.

\* \* \* \* \*